US006740815B2

(12) United States Patent
Hamai et al.

(10) Patent No.: US 6,740,815 B2
(45) Date of Patent: May 25, 2004

(54) LOCKING STRUCTURE AND WIRE-HARNESS COMPONENT

(75) Inventors: Tsuyoshi Hamai, Shizuoka-ken (JP); Toshiharu Kudo, Shizuoka-ken (JP); Masahiro Kanda, Shizuoka-ken (JP); Masanori Kikuchi, Tokyo (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/126,775

(22) Filed: Apr. 22, 2002

(65) Prior Publication Data

US 2002/0157854 A1 Oct. 31, 2002

(30) Foreign Application Priority Data

Apr. 27, 2001 (JP) ....................................... 2001-133186

(51) Int. Cl.[7] ............................................... H02G 13/00
(52) U.S. Cl. ................................... 174/71 R; 174/72 R
(58) Field of Search ............................ 174/72 A, 72 R, 174/69, 71 R, 95, 135; 52/220.1, 220.7; 248/49

(56) References Cited

U.S. PATENT DOCUMENTS 5,753,855 A * 5/1998 Nicoli et al. .................. 174/49
6,284,975 B1 * 9/2001 McCord et al. ........... 174/71 R

FOREIGN PATENT DOCUMENTS

JP 3039313 3/2000

* cited by examiner

*Primary Examiner*—Anthony Dinkins
*Assistant Examiner*—Adolfo Nino
(74) *Attorney, Agent, or Firm*—Finnegan, Henderson, Farabow, Garrett, & Dunner, L.L.P.

(57) ABSTRACT

The locking structure includes a locking part configured to lock with mating members defining locking holes. The locking part includes at least two insertion parts. The insertion parts include pairs of guide walls defining insertion channels extending in respective directions for inserting and supporting mating members. The insertion parts include locking protrusions between guide walls for engaging with the locking holes of the mating members.

7 Claims, 4 Drawing Sheets

LOCKING STRUCTURE AND WIRE-HARNESS COMPONENT

BACKGROUND OF THE INVENTION

The invention relates to a locking structure and, more specifically, to a wire-harness component employing one, such as a connector, a protector, an electric junction box, an electric control unit or a clip.

A locking structure is described in, for example, Japanese Patent NO. 3039313. The locking structure is provided to a bracket holder formed on an outer side of a tubular housing. The locking structure allows the housing to be fixed to a bracket of a vehicle body.

SUMMARY OF THE INVENTION

The locking structure, however, easily results in a vertical or transverse looseness between the bracket and the bracket holder. The looseness causes slanting or twisting in an insertion direction of the bracket. This deteriorates the stability of engagement of a bracket.

The present invention is directed to a locking structure which improves the stability of engagement of a bracket.

From a first aspect, the invention provides a locking structure. The locking structure includes a locking part configured to lock with mating members defining locking holes. The locking part includes at least two insertion parts. The insertion parts include pairs of guide walls defining insertion channels extending in respective directions for inserting and supporting mating members. The insertion parts include locking protrusions between guide walls for engaging with the locking holes of the mating members.

Preferably, the insertion parts include a common locking protrusion disposed at a crossing of center lines of the insertion channels for insertion and engagement.

Preferably, a respective locking protrusion is provided to a respective insertion channel.

Preferably, one of the insertion parts includes a stopper wall for abutting an end of a mating member.

From a second aspect, the invention provides a wire-harness component. The wire-harness component includes a casing. The wire-harness component includes a first locking part fixed to the casing for guiding a mating member to be locked. The wire-harness component includes a second locking part fixed to the casing for guiding another mating member to be locked. The second locking member crosses the first locking part. The wire-harness component includes an engagement member disposed at a crossing of the first locking part and the second locking part for engaging with a respective mating member.

Preferably, the engagement member stops a respective mating member from abutting.

Preferably, the engagement member locks with a respective mating member.

BRIEF DESCRIPTION OF THE ACCOMPANYING DRAWINGS

These and other features, aspects, and advantage of the present invention will become better under stood with reference to the following description, appended claims, and accompanying drawings where:

DETAILED DESCRIPTION OF THE PREFERRED EMBODIMENTS

Embodiments of the invention will be described with reference to drawings.

[First embodiment]

Figure 1:
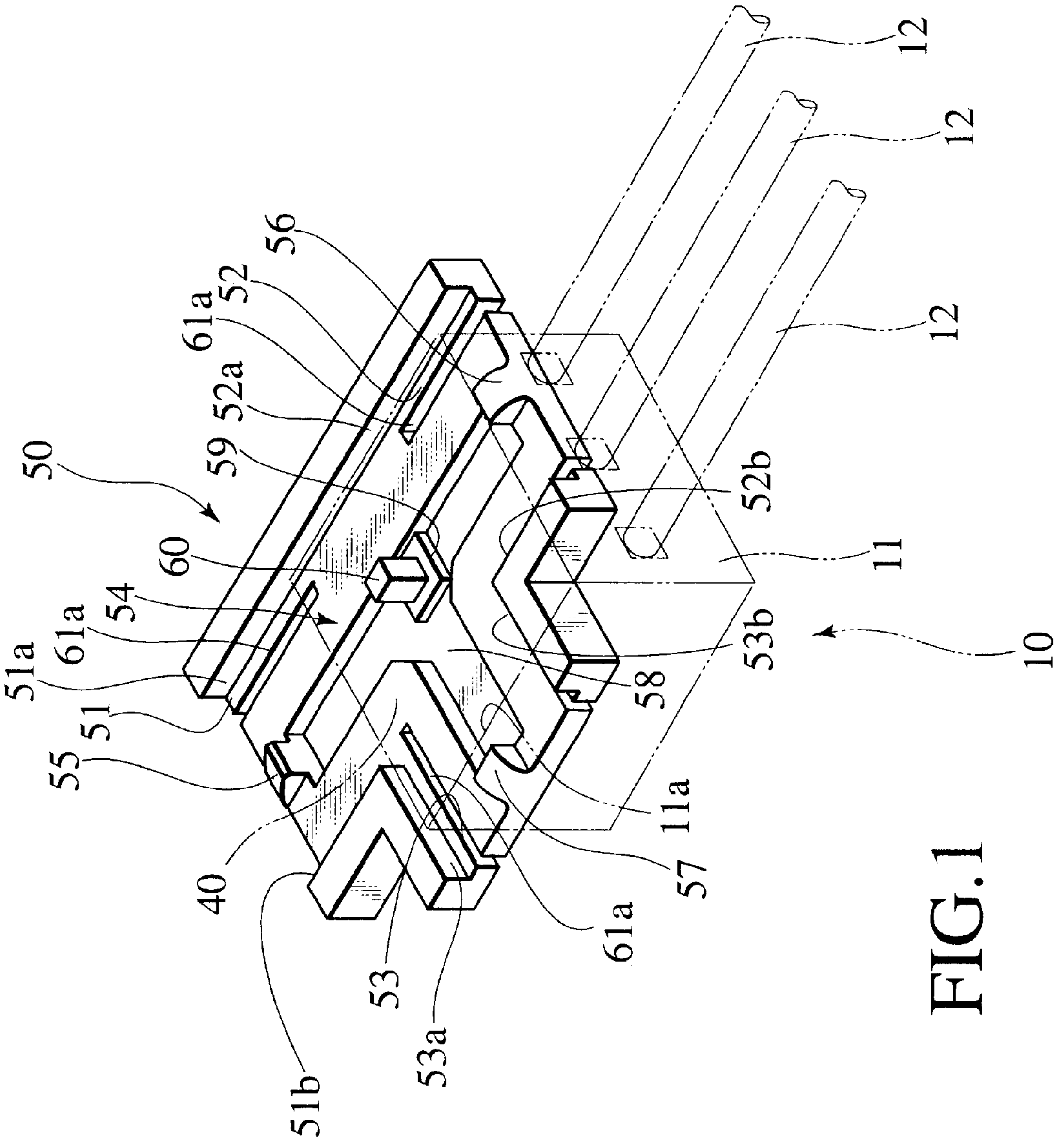
FIG. 1 is a sectional view of a first embodiment according to the connector of invention.
Figure 2:
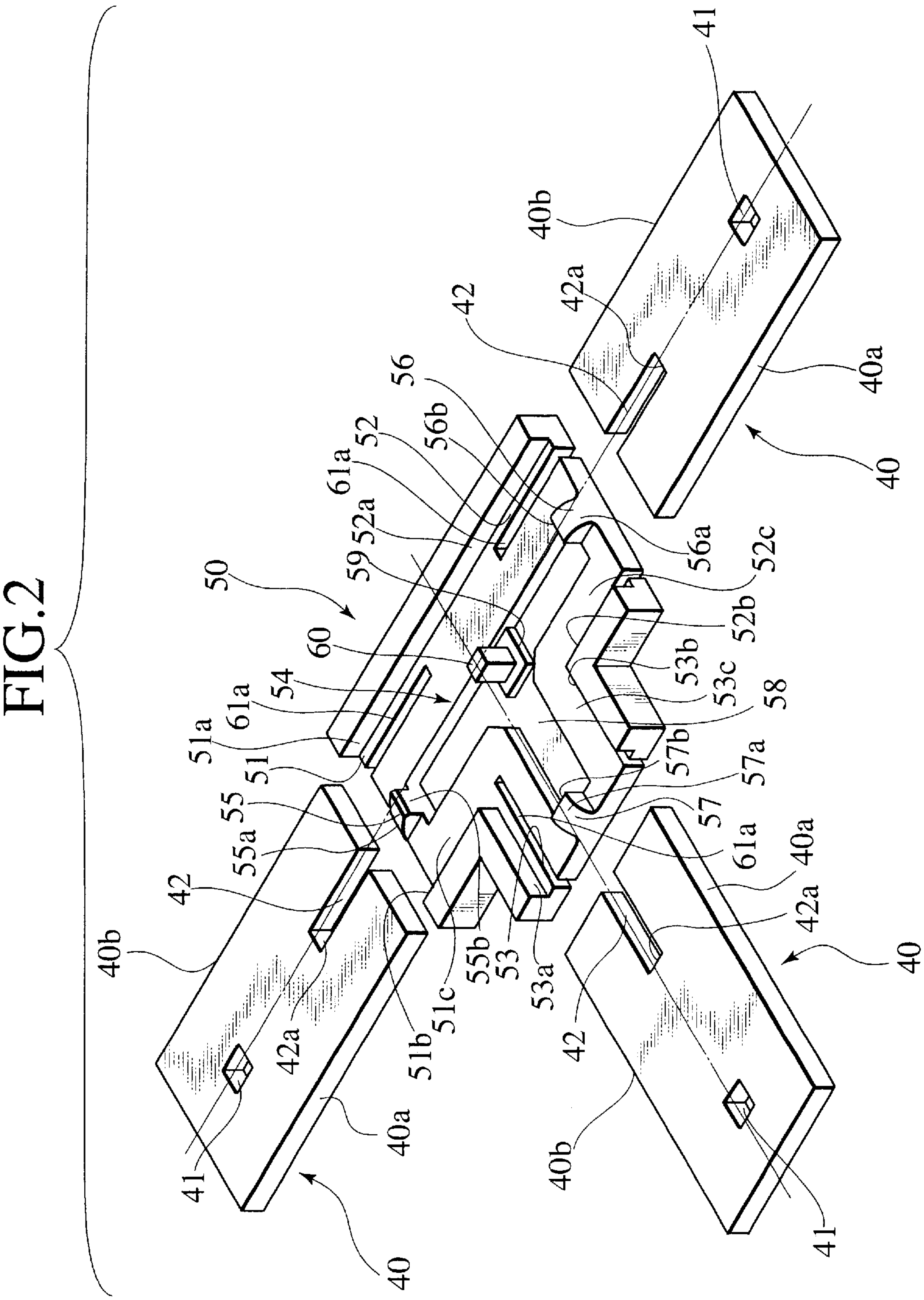
FIG. 2 is a perspective view of the locking structure in FIG. 1.
Figure 3:
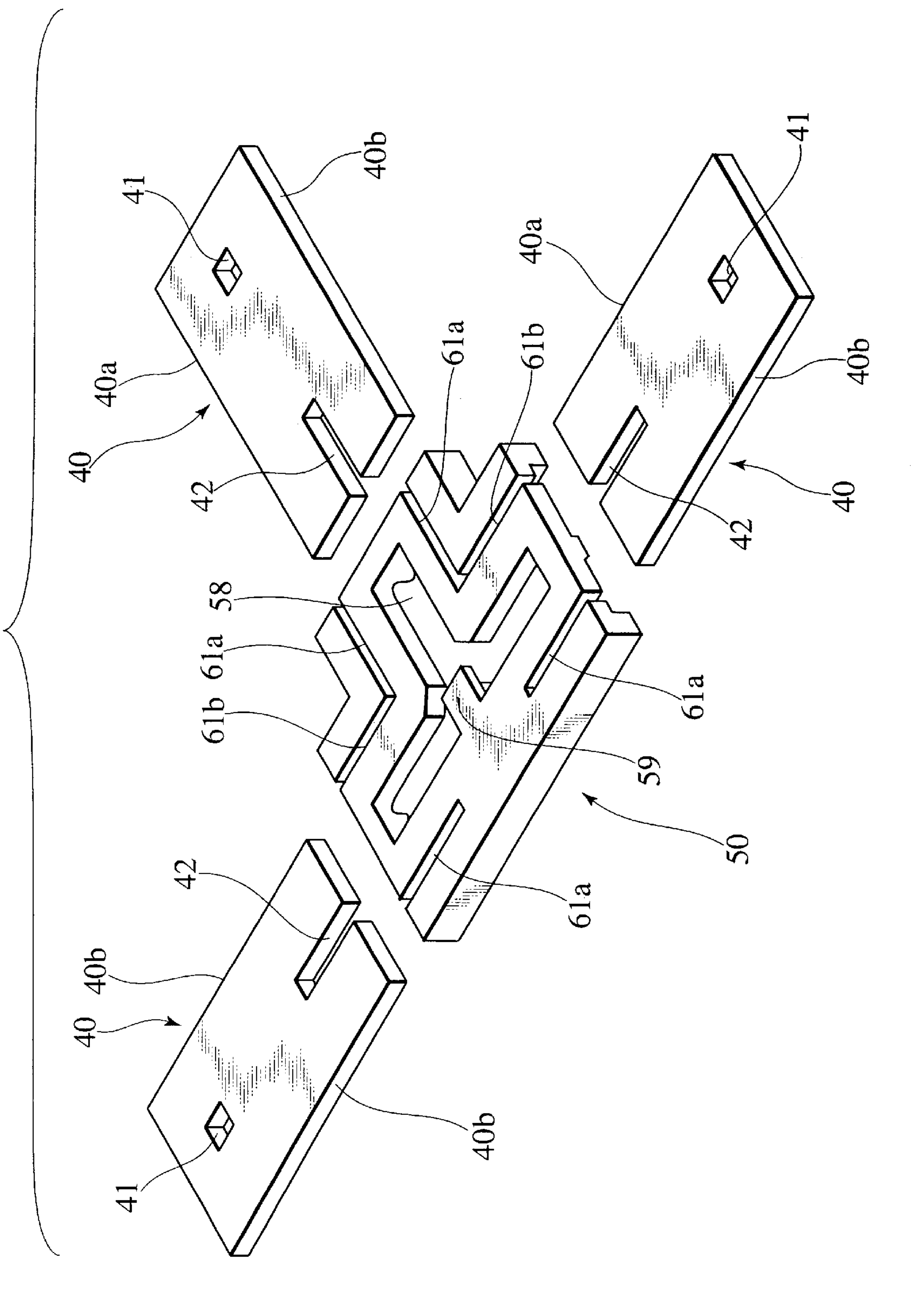
FIG. 3 is a rear view of the locking structure in FIG. 2.

As shown in FIG. 1, connector 10 includes housing 11. The housing 11 houses terminals connected to wires 12. The housing 11 has a side 11*a* integral with locking part 50. Housing 11 and locking part 50 are molded together. The side 11*a* may be welded, adhered or to the locking part 50. Housing 11, as shown in FIG. 2, is locked with flat plate-shaped bracket 40 mounted on a vehicle body panel.

Locking part 50 is formed of a flexible material such as a synthetic resin, with wholly a T-shape. The locking part includes three-directional insertion channels 51, 52, 53 for the insertion of brackets 40.

Channels 51 and 52 align and face each other. Channel 53 is at right angles relative to channels 51, 52. Each channel 51, 52, 53 has an identical depth. The crossing part of channels 51, 52, 53 constitutes common part 54.

Each channel 51, 52, 53 has transversely both side walls, which include a pair of guide walls 51*a* and 51*b*, 52*a* and 52*b*, 53*a* and 53*b* for the support of the both sides 40*a*, 40*b* of bracket 40.

Formed insertion-entrance side ends between walls 51*a* and 51*b*, 52*a* and 52*b*, 53*a* and 53*b* of channels 51, 52, 53 are wedge-shaped locking protrusions 55, 56, 57 which each protrude upward.

Protrusions 55, 56, 57 include oblique faces 55*a*, 56*a*, 57*a* relative to bottom face 51*c*, 52*c*, 53*c*, respectively. The faces each face the entrance of bracket 40. The protrusions include walls 55*b*, 56*b*, 57*b* at right angles relative to bottom faces 51*c*, 52*c*, 53*c* or the insertion directions and in opposite to the oblique faces 55*a*, 56*a*, 57*a*, respectively.

Disposed between protrusions 55, 56, 57 is T-shaped cut-out or recess 58 from bottom faces 51*c*, 52*c*, 53*c*. Disposed at the center of protrusions 55, 56, 57 is guide protrusion 60 which protrudes upward from recess 58 via support piece 59. The protrusion 60 is positioned at the crossing of channels 51 or 52 and 53, further specifically, at the crossing of center lines of channels 51, 52, 53.

The both sides of respective channels 51, 52, 53 include respective pair of slits along guide walls 51*a*, 51*b*, 52*a*, 52*b*, 53*a*, 53*c* in the insertion directions. The insertion of the respective ends of brackets 40 into respective channels 51, 52, 53 allows respective protrusions 55, 56, 57 to be flexed downwardly.

The rear end of each bracket 40 includes locking hole 41 for the insertion and engagement of each protrusion 55, 56, 57. The front end thereof includes guide groove or cut-out 42 which opens at the end thereof.

When protrusion 60 against rear end wall 42*a* of each cut-out 41, each protrusion 55, 56, 57 inserted in hole 41 for engagement. Hole 41 and end wall 42*a* have a distance therebetween identical to one between guide protrusion 60 and each locking protrusion 55, 56, 57.

Next, the operation of the first embodiment is described.

The end of bracket 40 is inserted into, for example, channels 51. The end flexes protrusion 55 downward, which is positioned at the end of insertion entrance. The both side walls 40a, 40b of bracket 40 are guided by the pair of guide walls 51a, 51b for insertion. Further inserting of bracket 40 allows protrusion 60 to be inserted into cut-out 42. The insertion allows the rear end wall of cut-out 42 to be abutted against protrusion 60. Protrusion 60 operates as a stopper for channel 51, thus preventing further inserting of bracket 40. At this time, flexed protrusion 55 faces hole 41 to restore. Protrusion 55 is inserted into hole 41 for engagement. The engagement allows the locking of bracket 40 with locking part 50.

Both sides 40a, 40b of bracket 40 are supported by the pair of walls 51a, 51b of channel 51.

Without the slant or twist of bracket 40, bracket 40 is easily inserted into the locking part for locking. Thus, the bracket improves in stability during engagement.

The protrusion 60 serves as a common stopper for channels 51, 52, 53. The embodiment is employed for a wire component such as a protector, an electric junction box, an ECU (Electric Control Unit, or a clip.

[Second Embodiment]

Figure 4:
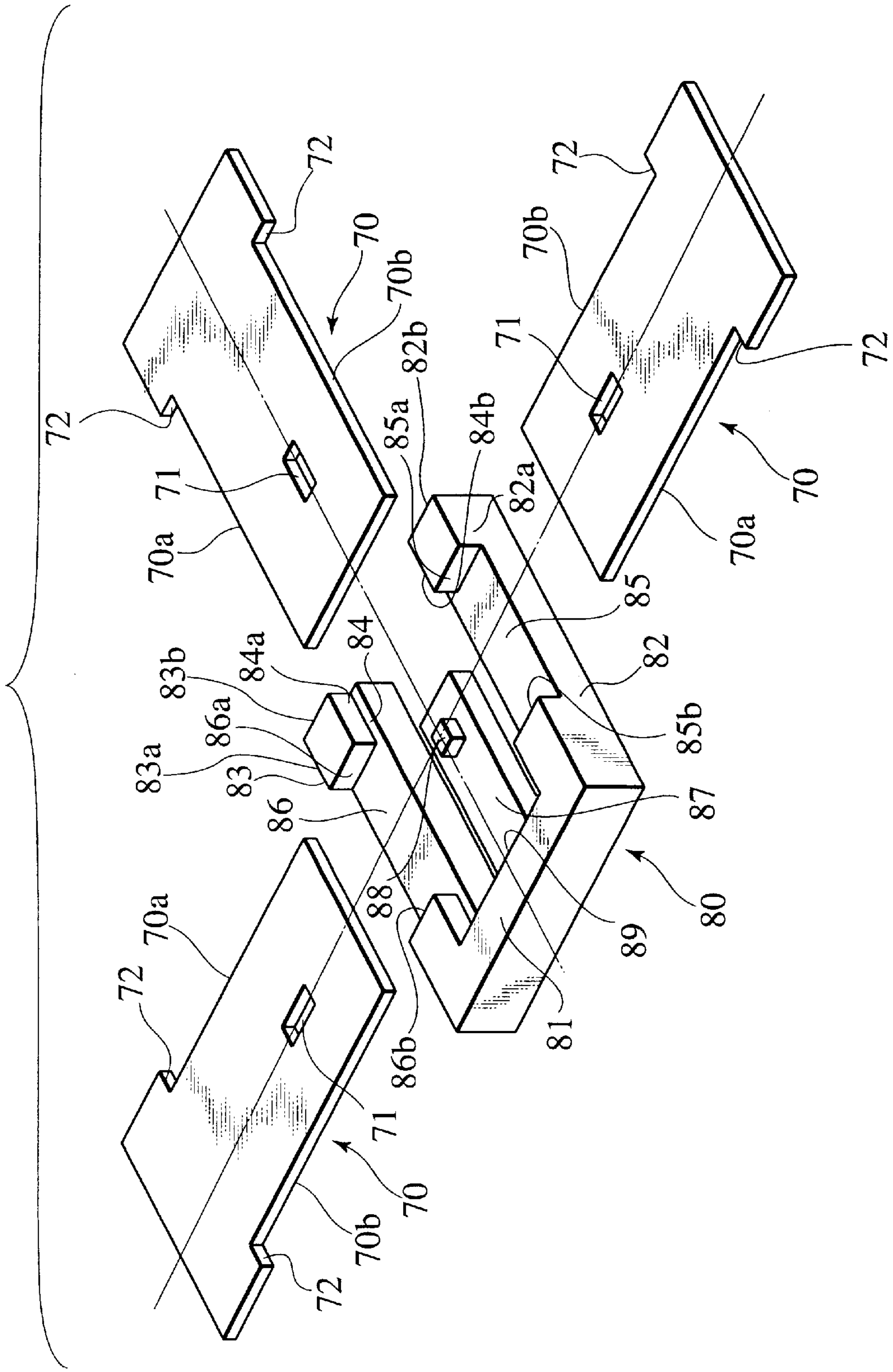
FIG. 4 is a perspective view of the locking structure in the second embodiment of the invention.

Locking part 80, shown in FIG. 4, is mounted to the housing 11 to fix to a flat plate-shaped bracket 70 mounted on a vehicle body panel.

Locking part 80 is formed of a flexible material such as a synthetic resin. The locking part includes a pair of insertion parts 82, 83 connected by connection part 81. The locking part includes three-directional insertion channels 84, 85, 86.

Channel 84 is formed between insertion parts 82, 83. Channel 85 is formed to insertion part 82. Channel 86 is formed to insertion part 83.

Channels 85, 86 align with each other at right angles to channel 84, with facing each other. Channels 84, 85, 86 each have an identical depth.

Respective channels 84, 85, 86 have both side walls or a pair of guide walls 84a and 84b, 85a and 85b, 86a and 86b for the support of both sides 70a, 70b of bracket 70.

Connection part 81 is disposed between a pair of insertion parts 82, 83. The connection part includes arm 87 extending longitudinally along the insertion parts 82, 83.

Arm 87 includes upwardly protruding locking protrusion 88 at the center of channels 84, 85, 86, or at the crossing of the center lines of the channels. Protrusion 88 is positioned at the crossing of channels 82 or 83 and 84. The protrusion is commonly locked with brackets 70 which are guided by channels 84, 85, 86.

Connection part 81 includes stopper wall 89 for abutting the end of bracket 70.

Bracket 70 includes locking hole 71 for the insertion and engagement of protrusion 88.

The rear end of bracket 70 includes stopper part 72, which serves as a stopper during the insertion into each channel 84, 85, 86.

The locking hole 71 is inserted into protrusion 88 for locking, when the end of bracket 70 abuts against stopper wall 89 of connection part 81 or when stopper parts 72 abut against insertion part 82, 83. Each outermost walls 82a and 83a, 82b and 83b of insertion parts 82, 83 and protrusion 88 are set at a distance therebetween identical to at one between hole 71 and stopper part 72 in the insertion direction.

Next, the operation of the second embodiment is described.

When being inserted into, for example, channel 84, the end of bracket 70 flexes protrusion 88 downward. Both side walls 70a, 70b are guided by the pair of guide walls 84a, 84b for the insertion of bracket 70. Further insertion of bracket 70 allows the end of bracket 70 to be abutted against stopper wall 89. When bracket 70 is inserted into each channel 85, 86, stopper part 72 abuts against the outermost wall 82a, 83a of each insertion part 82, 83.

At this time, the protrusion 88 faces the locking hole 71 of bracket 70. Flexed protrusion 88 restores to be inserted into hole 71 for engagement. The engagement allows the locking of bracket 70.

The sides 70a, 70b of bracket 70 are supported by the pair of walls 84a, 84b. The insertion of protrusion 88 into hole 71 for engagement allows the locking of locking part 80.

Without slant or twist, the insertion and engagement of bracket 70 is facilitated. The engagement improves stability during the engagement of the bracket.

The embodiment includes protrusion 88 at the center of the three directional channels 84, 85, 86. The protrusion is commonly inserted into holes 71 of brackets 70 for engagement. Thus, the providing of a single protrusion 88 reduces in productive cost.

The embodiment includes stopper wall 89 in channel 84 for abutting the end of bracket 70. The insertion of bracket 70 into channel 84 and the abutting of its end against stopper wall 89 allow-the facing of protrusion 88 and hole 71 for insertion and engagement. Thus, the stability during the engagement of the bracket further improves.

The entire content of Japanese Patent Application P2001-133186 (filed on Apr. 27, 2001) is incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A locking structure comprising:

a locking part configured to lock with mating members defining locking holes;

the locking part comprising:

at least two insertion parts comprising pairs of guide walls defining insertion channels extending in respective directions for inserting and supporting the mating members; and locking protrusions on the locking part and located between the guide walls for engaging with the locking holes of the mating members.

2. The locking structure according to claim 1, wherein a respective locking protrusion is provided to a respective insertion channel.

3. A locking structure comprising:

a locking part configured to lock with mating members defining locking holes;

the locking part comprising:

at least two insertion parts comprising pairs of guide walls defining insertion channels extending in respective directions for inserting and supporting the mating members; and locking protrusions on the locking part and located between the guide walls for engaging with the locking holes of the mating members;

wherein the at least two insertion parts comprise a common locking protrusion disposed at a crossing of center lines of the insertion channels for insertion and engagement.

4. The locking structure of claim 3, wherein one of the at least two insertion parts comprises a stopper wall for abutting an end of a mating member.

5. The wire-harness component comprising:

a casing;

a first locking part fixed to the casing for guiding a mating member to be locked;

a second locking part fixed to the causing for guiding another mating member to be locked, the second locking part crossing the first locking part; and an engagement member disposed at a crossing of the first locking part and the second locking part for engaging with a respective mating member.

6. The wire-harness component according to claim 5, wherein the engagement member stops a respective mating member from abutting.

7. The wire-harness component according to claim 5, wherein the engagement member locks with a respective mating member.

* * * * *

UNITED STATES PATENT AND TRADEMARK OFFICE

CERTIFICATE OF CORRECTION

PATENT NO. : 6,740,815 B2 
DATED : May 25, 2004
INVENTOR(S) : Tsuyoshi Hamai et al.

It is certified that error appears in the above-identified patent and that said Letters Patent is hereby corrected as shown below:

Column 5,
Line 3, “causing” should read -- casing --.

Signed and Sealed this

Fourteenth Day of December, 2004

JON W. DUDAS
*Director of the United States Patent and Trademark Office*